United States Patent [19]

Yasuda et al.

[11] Patent Number: 4,485,634
[45] Date of Patent: Dec. 4, 1984

[54] CONTROL DEVICE FOR AIR CONDITIONER FOR AUTOMOBILE

[75] Inventors: Mitsuo Yasuda; Toshizo Nishizawa; Kazuhide Yuchi; Hiroto Kawahira; Hideaki Nagatomo, all of Shizuoka, Japan

[73] Assignee: Mitsubishi Denki Kabushiki Kaisha, Tokyo, Japan

[21] Appl. No.: 449,203

[22] Filed: Dec. 13, 1982

[30] Foreign Application Priority Data

Jan. 18, 1982 [JP] Japan ................................ 57-5740

[51] Int. Cl.³ .............................................. F25B 1/00
[52] U.S. Cl. .................................. 62/196.2; 62/228.5; 62/229
[58] Field of Search ............... 62/229, 228.1, 228.5, 62/323.4, 196.1, 196.2, 196.3, 244, 243; 165/42, 43

[56] References Cited

U.S. PATENT DOCUMENTS

| | | | |
|---|---|---|---|
| 1,786,791 | 12/1930 | Terry | 62/196.3 |
| 2,296,304 | 9/1942 | Wolfert | 62/196.2 X |
| 2,759,333 | 8/1956 | Atchison | 62/228.5 X |
| 4,326,386 | 4/1982 | Tamura | 62/229 X |

FOREIGN PATENT DOCUMENTS 2068522  8/1981  United Kingdom .

*Primary Examiner*—Harry Tanner
*Attorney, Agent, or Firm*—Oblon, Fisher, Spivak, McClelland & Maier

[57] ABSTRACT

The disclosure describes a control device for the airconditioning device for automobile in which a rolling piston type capacity changeable compressor which can be operated with a single piston cylinder by closure of one of two coaxial cylinders in the compressor by means of an opening and closing valve is used and selection is made as to whether single cylinder or double cylinders should be employed for operation of the compressor depending on a cooling load to be imposed on it.

12 Claims, 6 Drawing Figures

CONTROL DEVICE FOR AIR CONDITIONER FOR AUTOMOBILE

BACKGROUND OF THE INVENTION

1. Field of the Invention

This invention relates to an air conditioner for an automobile, and more particularly, it is concerned with a control device for such air conditioner for an automobile, which closes one of two coaxial cylinders in a rolling piston type capacity-changeable compressor to reduce the cooling capability of the air conditioner and to eliminate waste input into the compressor when the passenger cabin in the automobile has attained a desired temperature, thereby providing constantly a comfortably air-conditioned passenger cabin.

2. Description of Prior Art

Generally speaking, the control device for the automobile cooling device carries out the temperature control within the passenger cabin of the automobile by turning on and off of an electromagnetic clutch which is equipped on the compressor and transmits driving force of an automobile engine through detection of a temperature of an outlet air which has passed through a cooling device in the passenger cabin or a temperature of an inlet air into the cooling device, and through comparison of the detected temperature with a preset cabin temperature.

In such temperature control method, however, when the cabin temperature is approaching a preset temperature level, there tends to occur such a phenomenon that the abovementioned electromagnetic clutch begins to turn on and off frequently to maintain the cabin temperature at the predetermined level, thereby continuing and discontinuing the operations of the compressor. When the compressor runs into this condition, the temperature of the outlet air which has passed through the cooling device undergoes abrupt change due to the continued and discontinued operations of the compressor by the turn-on and off of the compressor, on account of which the occupants in the passenger cabin feel uncomfortableness owing to their directly receiving cooled air within the cabin. Further, even when high and low pressure conditions in the cooling cycle take a balance with a cooling load after stoppage of operations of the compressor due to turning off of the electromagnetic clutch, and the electromagnetic clutch turns on again as the result of the balancing, there is inevitable waste in input until the cooling cycle reaches its high and low pressure levels to enable it to perform the required work.

SUMMARY OF THE INVENTION

The present invention has been made in view of the abovementioned shortcomings inherent in the conventional air-conditioner for the automobile, and is to provide an improved control device for the air-conditioning device for automobile which pursue attainment of comfortableness in the passenger cabin and saving in the fuel cost, which could only be realized by use of a rolling piston type capacity-changeable compressor which can be operated with a single piston cylinder by closure of one of two coaxial cylinders in the compressor by means of an opening and closing valve, wherein selection is made as to whether single cylinder or double cylinders should be employed for operation for the compressor depending on a cooling load to be imposed on it.

Another object of the present invention is to provide a control device for an automobile air-conditioner, wherein use is made of a capacity-changeable compressor which is capable of operating an opening and closing device (valve) provided at an inlet port of one of two coaxial cylinders in a compression structure to stop flow of a coolant into one of the cylinders, thereby performing the compression stroke with a single cylinder and to cause the outlet quantity of the coolant from the compressor to be variable, the control device being so constructed that the operating condition of the capacity-changeable compressor can be switched to either of the two-cylinder operation, the single-cylinder operation, and the stoppage of operation depending on the preset temperature for the vehicle.

According to the present invention, in general aspect of it, there is provided a control device for an air-conditioner for automobile, comprising: an electromagnetic clutch for selectively transmitting revolution of an automobile engine; a compressor having a compressor driving shaft connected with the electromagnetic clutch, independent first and second compression mechanisms for compressing a coolant along with rotation of the compressor driving shaft, an outlet port for discharging the coolant which has been compressed by the compression mechanisms, and an inlet port for introducing the coolant into the first and second compression mechanisms, the compressor being brought to an idling condition, when supply of the inlet coolant to the first or second compression mechanism is forcibly stopped, to thereby reduce an outlet quantity of the coolant; a condenser, an expanding device, and a cooling device sequentially connected in the order by way of coolant passage tubing between the outlet port and the inlet port of the compressor; opening and closing valve means for stopping supply of the inlet coolant to either the first or second compression mechanism, the opening and closing valve means causing the coolant outlet quantity from the compressor to be variable by the on-and-off operation thereof; and control means for controlling the electromagnetic clutch and/or the opening and closing valve means by input signals of a preset temperature level in a passenger cabin of the automobile and a detected temperature of the passenger cabin, thereby controlling the compressor to be in an operative condition with both compression mechanisms, or an operative condition with a single compression mechanism, or an operation stoppage condition.

The foregoing objects, other objects as well as the specific construction and operations of the control device for the automobile air-conditioner according to the present invention will become more apparent and understandable from the following detailed description thereof, when read in conjunction with the accompanying drawing.

DETAILED DESCRIPTION OF THE PREFERRED EMBODIMENTS

In the following, the present invention will be explained in detail in reference to the accompanying drawing illustrating a preferred embodiment thereof.

Figure 1:
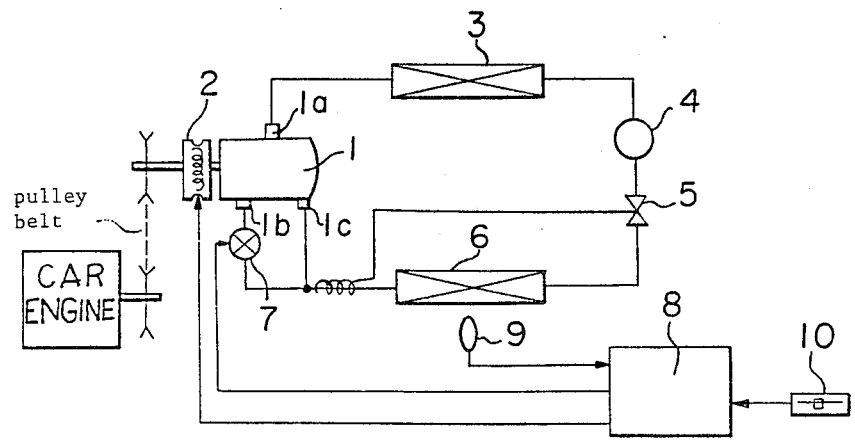
FIG. 1 is a schematic diagram showing a cooling system of an air-conditioning device for an automobile according to the present invention.
Figure 2:
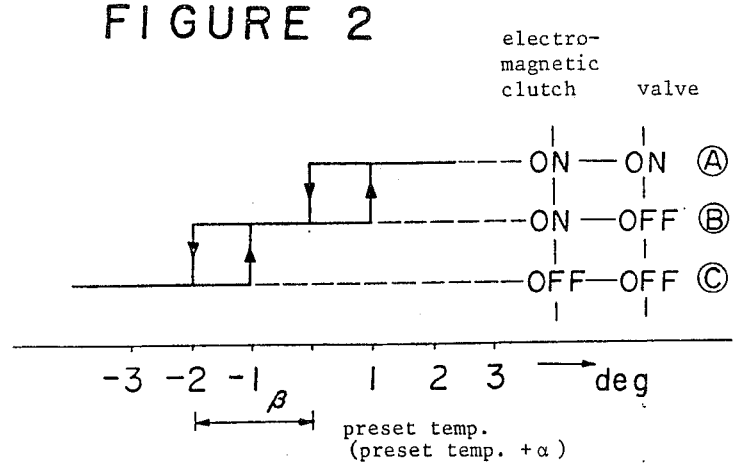
FIG. 2 is a diagram showing control characteristics of the control device according to the present invention.

In FIG. 1, a reference numeral 1 designates a rolling piston type capacity-changeable compressor having a single outlet port 1a and inlet ports 1b, 1c for each of cylinders; a numeral 2 refers to an electromagnetic clutch equipped on the compressor 1; a numeral 3 represents a condenser for condensing gas at a high temperature and a high pressure, which is discharged from the outlet port 1a of the compressor 1; a numeral 4 denotes a receiver drier to retain therein liquid coolant at such high temperature and high pressure, which has been condensed by the condenser 3; a numeral 5 refers to a throttle device which is an expansion valve to vary its throttling quantity in accordance with the coolant evaporating condition; a numeral 6 represents a cooling device for evaporating the liquid coolant which has been rendered by the expansion valve 5 to be at a low temperature and a low pressure, and for depriving air in the passenger cabin supplied thereinto by a fan (not shown) of heat; a reference numeral 7 designates an opening and closing valve provided at one of the tubings (e.g., 1b) to lead the coolant discharged from the cooling device 6 into each of the inlet ports 1b, 1c of the compressor 1; and a numeral 8 denotes a control device for controlling the abovementioned electromagnetic clutch 2 and the opening and closing valve 7 by means of a temperature detecting unit 9 to detect a temperature of air in the passenger cabin which has been heat-exchanged by the cooling device 6 and a temperature level setting device 10 provided in the passenger cabin, the control characteristics of this control device 8 being shown in FIG. 2.

Figure 3:
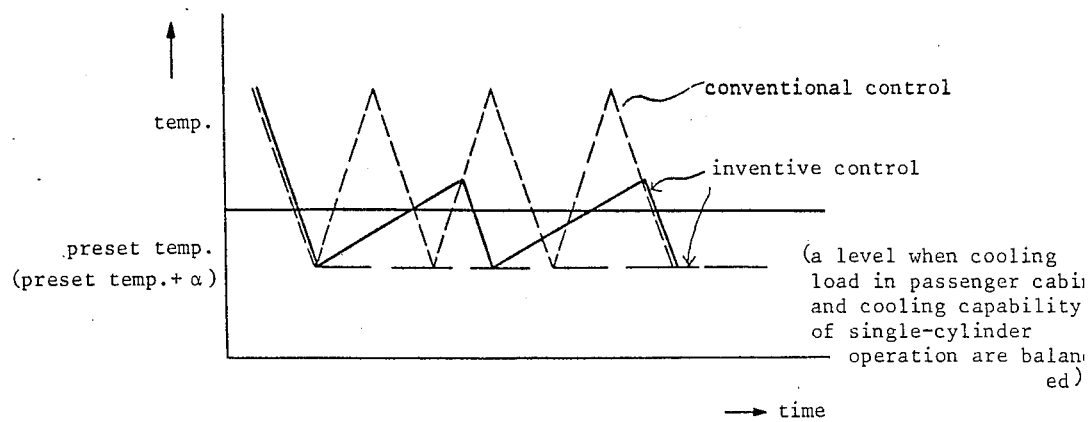
FIG. 3 is a diagram showing temperature characteristics of the system according to the present invention.

Explaining the operations of this air-conditioning device for an automobile of the above-described construction, the control device 8 produces as outputs to the electromagnetic clutch 2 and the opening and closing valve 7, respectively, a temperature value from the temperature detecting unit 9 such as a thermister, etc. which has sensed an inlet temperature into, or outlet temperature from the cooling device 6, and a temperature for the passenger cabin which has been preset by the temperature level setting device 10, on the basis of the control characteristics of the device 8 as shown in FIG. 2. In more detail, as shown in the control characteristics diagram in FIG. 2, both electromagnetic clutch 2 and the opening and closing valve 7 are in their "ON" condition (i.e., the condition A) up to a preset temperature (or a set temperature $+\alpha$), wherein the driving force from the automobile engine is transmitted to the compressor 1 by the "ON" condition (engagement) of the electromagnetic clutch 2 to thereby actuate the compressor, while flow of the coolant discharged from the cooling device 6 is led into each of the cylinders in the compressor 1 through the inlet ports 1b and 1c thereof when the opening and closing valve 7 is opened, whereby the compression of the coolant is performed with two cylinders, and the compressor displays its maximum capability to rapidly cool the air within the passenger cabin of the automobile to approach the preset temperature level. When a temperature sensed by the temperature detecting unit 9 has become lower than the preset temperature (or a set temperature $+\alpha$), the electromagnetic clutch 2 is maintained in its engaged (or "ON") condition, while the opening and closing valve 7 is brought to a closed (or "OFF") condition (i.e. the condition B) to thereby stop the flow of the coolant, which has so far been flowing into both inlet ports 1b, 1c of the compressor 1, into the inlet port 1b by the closure ("OFF") of the opening and closing valve 7, thereby operating the compressor 1 with a single cylinder to reduce the capability of the compressor to a half for cooling the passenger cabin. Thereafter, when a required load for cooling the passenger cabin and the cooling capability of the compressor 1 with the single cylinder operation are balanced, the compressor operation is continued in its condition as it is. Should the required load for the cooling be greater than the cooling capability of the compressor, it is again changed over to the two-cylinder operation for the maximum cooling capability with a certain degree of hysteresis (indicated in FIG. 2 with "1 deg."). Conversely, when the cooling load within the passenger cabin is small, and the temperature sensed by the temperature detecting unit 9 is lower than the preset temperature (or the set temperature $+\alpha$) by $\beta$ degree (indicated in FIG. 2 with "2 deg."), the electromagnetic clutch 2 is turned off (or disengaged) to stop operation of the compressor 1. Then, the single cylinder operation is again effected with a certain degree of hysteresis (in FIG. 2, this is indicated with "1 deg."). The operation of the compressor 1 in the ordinary season for cooling the passanger cabin is performed either by the single cylinder or by the double cylinder. In such a case, the outlet temperature (or inlet temperature) has a small temperature difference with the preset temperature, unlike the conventional control device, as shown in FIG. 3. Further, a rising gradient of the outlet temperature (or inlet temperature) is gentle, because the temperature increases gradually with the single cylinder operation of the compressor 1. Furthermore, when the required load for cooling the passenger cabin takes a balance with the cooling capability of the compressor with its single cylinder operation, the outlet temperature (or inlet temperature) becomes constant, whereby a comfortable cooling condition can be secured. Moreover, according to the control device of the present invention, since the compressor 1 is operated respectively with its single-cylinder operation and the double-cylinder operation in an ordinary season for cooling the passenger cabin, it is constantly in its motion without any stoppage whatsoever as in the conventional control device, which contributes to saving of waste motive power at the time of actuating the compressor.

As stated in the foregoing, the control device for the automobile air-conditioning device according to the present invention is capable of effecting the cooling operation in conformity to the load for cooling the passenger cabin, making much use of the characteristic property of the rolling piston type capacity-changeable compressor, to produce a comfortably air-conditioned vehicle cabin without abrupt changed caused to the outlet coolant temperature from (or inlet coolant temperature into) the cooling device 6. In addition, the present invention can provide a cooling device of a low energy cost by reducing frequency of the turn-on and off operations of the compressor, and others, the resulting effects of which are remarkable.

Figure 4:
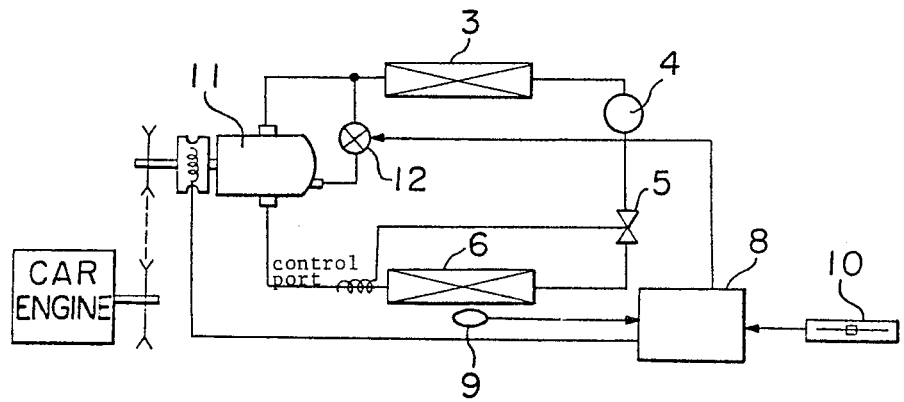
FIG. 4 is a schematic diagram showing a cooling system of an air-conditioning device for an automobile using a capacity-changeable compressor, in which an opening and closing valve device is incorporated.

FIG. 4 illustrates a rolling piston type capacity-changeable compressor 11 which has the opening and closing valve gear 7 incorporated therein to stop the flow of the cooling medium into the cylinders thereof, and which utilizes a high pressure outlet gas from the compressor as a drive power source for the valve, wherein the same effect as with the afore-described compressor can be obtained by regulating a pilot electromagnetic valve 12.

Figure 5:
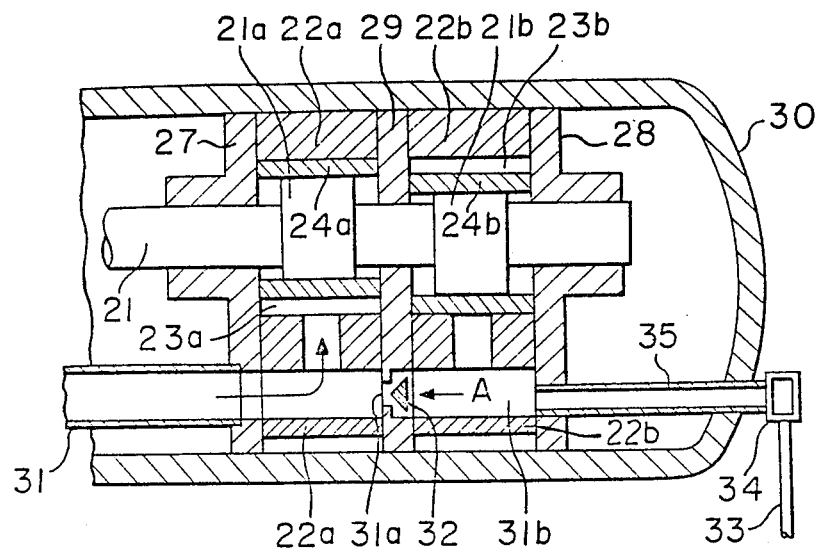
FIGS. 5 and 6 are respectively longitudinal cross-sectional views of a construction of the rolling piston type capacity-changeable compressor with the opening and closing valve device incorporated therein and being useful for the purpose of the present invention.
Figure 6:
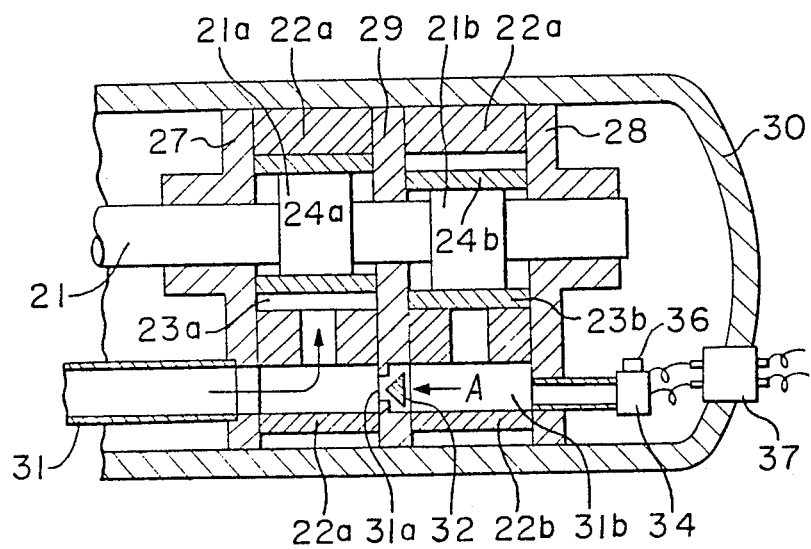

In the following, brief explanations will be given for the capacity-changeable compressor used in the actual embodiment of the present invention, in reference to FIGS. 5 and 6 showing a rotary compressor corresponding to the compressor 11 in FIG. 4.

In the drawing, a reference numeral 21 designates a drive shaft having eccentric portions 21a, 21b; numerals 22a 22b refer to cylinders having, in their inner peripheral part, respective compression chambers 23a, 23b which are concentric with the drive shaft 21; 24a, 24b represent rolling pistons which are respectively driven by the eccentric portions 21a, 21b of the drive shaft 21 and rolled along the inner peripheral wall of the cylinders 22a, 22b. In the cylinder 22a, 22b, there are respectively provided planar vanes (not shown) to urge the outer peripheral part of the rolling pistons 24a, 24b in the axial direction to separate the compression chambers 23a, 23b to a low pressure side and a high pressure side and springs (not shown) mounted within the cylinders 22a, 22b and to urge the planar vanes. A reference numeral 27 indicates an end plate at the driving side of the compression chamber 23a, which closes the driving side and is supported on the drive shaft 21 through a bearing (not shown); 28 refers to an end plate at the side opposite the driving side, which closes the non-driving side of the compression chamber 23b and is supported on the drive shaft 21 through a bearing (not shown); 29 denotes a partition plate to separate the compression chamber 23a and the compression chamber 23b, and to close the respective openings thereof; 30 designates a hermetically sealed container to accommodate therein those elements for compression consisting of the above-enumerated parts; 31 represents a low pressure gas inlet pipe to feed a low pressure coolant gas into a low pressure part of the compression chamber 23a, 23b; 32 refers to a check valve as a control member, which is provided at an inlet passageway 31a in the partition plate 29, and is usually opened to be closed with a gas pressure applied from an arrow direction A; 33 designates a conduit pipe which is communicatively connected to the high pressure side of the compression chamber 23b; 34 refers to an electromagnetic valve which is connected with the conduit pipe 33 and is opened and closed by electrical signals; and 35 represents a connecting pipe which is connected at its one end with the electromagnetic valve 34 and is communicatively connected at its other end with the inlet passageway 31b.

When it is desired that the flow rate of the coolant gas recycling between the compressor of the above-described construction and the chilling unit (circuit) be reduced, and that the output of the compressor be made small, the electromagnetic valve 34 may be opened, whereby a high pressure of the coolant gas in the arrow direction A is applied to the check valve 32 through the connecting pipe 35, and the check valve 32 is closed. As the result of this, low pressure coolant gas is not supplied to the compression chamber 23b of the cylinder 22b, and the rolling piston 24b is in an idling condition, whereby the flowrate of the recycling coolant gas discharged from the outlet tube is reduced, hence the drive power to be used is also reduced.

Although, in the above-described construction of the compressor, the electromagnetic valve 34 is provided outside the hermetically sealed container 30, it may also be feasible that, as shown in FIG. 6, the valve 34 be provided inside the hermetically sealed container 30 and a conduit pipe 36 communicating to the high pressure side of the compression chamber 23a be connected with the electromagnetic valve 34. In this manner, there may be obtained the compressor of the same function as that of the former, wherein the electromagnetic valve is provided outside the sealed container (FIG. 5), and, at the same time, the compressor of a simplified construction can be realized. Incidentally, a reference numeral 37 in FIG. 6 designates a hermetically sealed terminal which passes through the sealed container 30 and transmits electrical signals to the electromagnetic valve 34. In passing, the compressor corresponding to the one shown in FIG. 1 may be constructed by making the partition plate 29 in the compressor shown in FIG. 5 of a single sheet of plate having no check valve 32 provided therein, and by replacing the connecting pipe 35 with one similar to the inlet pipe 31.

In the foregoing, the present invention has been described specifically with reference to preferred embodiments thereof. It should, however, be noted that the invention is not limited to these embodiments alone, but any changes and modifications may be made within the ambit of the invention as set forth in the appended claims.

We claim:

1. A control device for an air-conditioner for automobile, which comprises in combination:
   (a) an electromagnetic clutch for selectively transmitting rotation of an automobile engine;
   (b) a compressor having a drive shaft connected to said electromagnetic clutch, independent first and second compression mechanisms for compressing a cooling medium due to rotation of said drive shaft, outlet means for discharging the cooling medium compressed by said compression mechanisms, and inlet means for introducing said cooling medium into said first and second compression mechanisms;
   (c) a condenser, an expanding device, and a cooling device which are sequentially connected in order by cooling medium supply tubing between said outlet port and said inlet port of said compressor;
   (d) opening and closing valve means actuatable for selectively stopping supply of said inlet cooling medium to one of said first compression mechanism and said second compression mechanism, an actuation of said opening and closing valve means causing the outlet quantity of said cooling medium from said compressor to vary; and
   (e) control means for controlling said electromagnetic clutch and said opening and closing valve means as a function of input signals of a preset temperature in a passenger cabin of the automobile and a detected temperature in the passenger cabin, thereby controlling said compressor.

2. The control device according to claim 1, including a temperature sensor subject to air cooled by said heat exchanger for supplying said signal for the detected temperature in the passenger cabin.

3. The control device according to claim 1, wherein said inlet means comprise first and second inlet ports, each corresponding to one of said first and second compression mechanisms, and said opening and closing valve means being provided in said cooling medium supply tubing connected with one of said first and second inlet ports.

4. The control device according to claim 3, wherein said opening and closing valve means is an electromagnetic valve.

5. The control device according to claim 1, wherein said opening and closing valve means is constructed with a control valve provided in said compressor.

6. The control device according to claim 5, wherein said control valve is turned on and off by use of high pressure said cooling medium discharged from compressor.

7. The control device according to claim 6, wherein said control valve is turned on and off by providing an electromagnetic valve in said cooling medium supply tubing which applies a high pressure medium to said control valve.

8. The control device according to claim 1, wherein said expansion means is a throttle type expansion valve.

9. A control device for an air-conditioner for automobile, which comprises in combination:
   (a) an electromagnetic clutch for selectively transmitting rotation of an automobile engine;
   (b) a compressor having a drive shaft connected to said electromagnetic clutch, independent first and second compression mechanisms for compressing a cooling medium due to rotation of said drive shaft, outlet means for discharging the cooling medium compressed by said compression mechanisms, a common inlet port for introducing the cooling medium into said first and second compression mechanisms, a control port for receiving a high pressure cooling medium, and a control valve for interrupting flow of said high pressure cooling medium from said control port into one of said first and second compression mechanisms;
   (c) a condenser, an expansion device, and a cooling device which are sequentially connected in order by cooling medium supply tubing between said outlet port and said inlet port of said compressor;
   (d) an opening and closing valve provided in a controlled cooling medium supply pipe for feeding said high pressure cooling medium into said control port, said opening and closing valve acting on the control valve of said compressor by the on-and-off operations thereof to cause the outlet quantity of said cooling medium from said compressor to vary; and
   (e) control means for controlling said electromagnetic clutch and said opening and closing valve by input signals for a preset temperature in a passenger cabin of the automobile and a detected temperature in the passenger cabin, thereby rendering a control of said compressor.

10. The control device according to claim 9 including a temperature sensor subject to air cooled by said heat exchanger for supplying, said signal for the detected temperature in the passenger cabin.

11. The control device according to claim 9, wherein said opening and closing valve is an electromagnetic valve.

12. A control device for an air-conditioner for automobile, comprising a capacity changeable compressor having coaxial cylinders and an inlet port, an opening and closin device provided at said inlet port of one of said two coaxial cylinders in a compressive structure of said compressor to stop flow of a cooling medium into one of said cylinders, thereby performing the compression stroke with a single cylinder and to cause the outlet quantity of the cooling medium from the compressor to be variable, wherein said control device includes clutch means and is so constructed that an operating condition of said capacity changeable compressor may be changed over to one of the two-cylinder operation, the single cylinder operation, and the stoppage of operation thereof depending on the preset temperature in the passenger cabin and a detected passenger cabin temperature.

* * * * *